United States Patent
Kroupa

(10) Patent No.: US 7,904,570 B1
(45) Date of Patent: Mar. 8, 2011

(54) CONFIGURABLE FILE PLACEMENT

(75) Inventor: Brandon Kroupa, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1718 days.

(21) Appl. No.: 11/019,101

(22) Filed: Dec. 21, 2004

(51) Int. Cl.
G06F 15/16 (2006.01)

(52) U.S. Cl. ......... 709/229; 709/201; 709/203; 709/245; 709/246

(58) Field of Classification Search .................. 709/229, 709/245, 246, 200, 201, 203
See application file for complete search history.

(56) References Cited

U.S. PATENT DOCUMENTS

| | | | |
|---|---|---|---|
| 5,572,643 A | 11/1996 | Judson | |
| 5,778,389 A | 7/1998 | Pruett et al. | |
| 5,892,908 A | 4/1999 | Hughes et al. | |
| 6,012,071 A * | 1/2000 | Krishna et al. | 715/201 |
| 6,061,692 A * | 5/2000 | Thomas et al. | 707/613 |
| 6,061,697 A | 5/2000 | Nakao | |
| 6,078,929 A | 6/2000 | Rao | |
| 6,145,003 A | 11/2000 | Sanu et al. | |
| 6,148,289 A | 11/2000 | Virdy | |
| 6,167,453 A | 12/2000 | Becker et al. | |
| 6,385,606 B2 | 5/2002 | Inohara et al. | |
| 6,393,420 B1 | 5/2002 | Peters | |
| 6,516,337 B1 * | 2/2003 | Tripp et al. | 709/202 |
| 6,519,626 B1 | 2/2003 | Soderburg et al. | |
| 6,626,957 B1 * | 9/2003 | Lippert et al. | 715/234 |
| 6,629,127 B1 * | 9/2003 | Deen et al. | 709/203 |
| 6,823,478 B1 | 11/2004 | Prologo et al. | |
| 6,944,658 B1 | 9/2005 | Schneider | |
| 6,959,288 B1 | 10/2005 | Medina et al. | |
| 6,985,936 B2 | 1/2006 | Agarwalla et al. | |
| 6,990,629 B1 * | 1/2006 | Heaney et al. | 715/200 |
| 7,032,000 B2 | 4/2006 | Tripp | |
| 7,062,506 B2 * | 6/2006 | Taylor et al. | 707/102 |
| 7,086,050 B2 | 8/2006 | Barton et al. | |
| 7,117,504 B2 * | 10/2006 | Smith et al. | 719/328 |
| 7,213,201 B2 | 5/2007 | Brown et al. | |
| 7,263,534 B1 | 8/2007 | Margulis | |
| 7,269,664 B2 * | 9/2007 | Hutsch et al. | 709/246 |
| 7,281,060 B2 * | 10/2007 | Hofmann et al. | 709/246 |
| 7,287,227 B2 | 10/2007 | Ries et al. | |
| 7,448,032 B2 | 11/2008 | Boubonnais | |
| 7,457,805 B2 | 11/2008 | Deen et al. | |
| 7,480,910 B1 | 1/2009 | Kuwamoto et al. | |

(Continued)

OTHER PUBLICATIONS

U.S. Appl. No. 10/689,860, Darrick P Brown.

(Continued)

*Primary Examiner* — Nathan Flynn
*Assistant Examiner* — Mohammad A Siddiqi
(74) *Attorney, Agent, or Firm* — Kilpatrick Townsend & Stockton LLP

(57) ABSTRACT

In publishing to a Web server, a set of placement rules are entered by a user. These placement rules set a location on the Web server for storing the various files supporting a request to publish to the Web server. Type identifiers, such as file extensions, Multipurpose Internet Mail Extensions (MIME) types, and the like, are used in the rules to assign certain types of files to the desired locations. When a developer or designer requests to publish to the Web server, all of the files supporting this publication request are read to determine their file type identifiers. Using the type identifiers, a location is assigned to each of the files that corresponds to the location assigned in the placement rules.

28 Claims, 4 Drawing Sheets

U.S. PATENT DOCUMENTS

| | | |
|---|---|---|
| 2001/0002470 A1 | 5/2001 | Inohara et al. |
| 2002/0023112 A1 | 2/2002 | Avital |
| 2003/0023632 A1 | 1/2003 | Ries et al. |
| 2003/0061278 A1 | 3/2003 | Agarwalla et al. |
| 2003/0167317 A1 | 9/2003 | Deen et al. |
| 2003/0220924 A1 | 11/2003 | Bourbonnais |
| 2004/0177321 A1 | 9/2004 | Brown et al. |

OTHER PUBLICATIONS

U.S. Appl. No. 10/689,870, Josh K. Margulis.
U.S. Appl. No. 10/690,980, filed Oct. 21, 2003.
Office Action dated Nov. 8, 2005 in related U.S. Appl. No. 10/690,980.
Office Action dated Feb. 27, 2006 in related U.S. Appl. No. 10/690,980.
Office Action dated Jul. 27, 2006 in related U.S. Appl. No. 10/690,980.
Office Action dated Dec. 15, 2006 in related U.S. Appl. No. 10/690,980.
Examiner's Answer to Appeal Brief dated Jul. 30, 2007 in related U.S. Appl. No. 10/690,980.
Decision of BPAI dated Jul. 31, 2009 in U.S. Appl. No. 10/690,980.
Office Action dated Oct. 18, 2006 in related U.S. Appl. No. 10/689,870.
Notice of Allowance dated Apr. 23, 2007 in related U.S. Appl. No. 10/689,870.
U.S. Appl. No. 10/690,214, filed Oct. 21, 2003.
Office Action dated Mar. 21, 2006 in related U.S. Appl. No. 10/690,214.
Office Action dated Sep. 8, 2006 in related U.S. Appl. No. 10/690,214.
Examiner's Answer to Appeal Brief dated May 31, 2007 in related U.S. Appl. No. 10/690,214.
Office Action dated May 16, 2007 in related U.S. Appl. No. 10/689,860.
Office Action dated Nov. 1, 2007 in related U.S. Appl. No. 10/689,860.
Interview Summary dated Mar. 6, 2008 in related U.S. Appl. No. 10/689,860.
Office Action dated May 5, 2008 in related U.S. Appl. No. 10/689,860.
Office Action dated Oct. 31, 2008 in related U.S. Appl. No. 10/689,860.
Office Action dated Aug. 19, 2009 in related U.S. Appl. No. 10/689,860.
U.S. Appl. No. 11/841,428, filed Aug. 20, 2007.
Office Action dated Jul. 21, 2009 in related U.S. Appl. No. 11/841,428.
Berners-Lee, et al., "RFC 1738—Uniform Resource Locations (URL)"—Dec. 1994.
Dreamweaver TechNote 16416, "How to make an inherited editable region uneditable," Jul. 6, 2002, p. 1-4.
Macromedia Dreamweaver MX: Training from the Source, published Jul. 23, 200, Safari Tech Books Online version, http://proquestsafaribooksonline.com, p. 1-39.
Fraternali, P., "Tools and Approaches for Developing Data-Intensive Web Applications: A Survey," ACM Computing Surveys, vol. 31, Issue 3, Sep. 1999, p. 227-263.
Altova Inc. & Altova GmbH, "XML Spy 4.0 Manual," copyright 1998-2001, Chapter 3, consisting of pp. 91-286.
GlobalScape, "CuteFTP Pro Technical Overview," White Paper, May 22, 2001, published on the Internet at least by Aug. 14, 2002 from: http://web.archive.org/web/20020814133509/www.globalscape.com/support/manuals.shtml, pp. i-ii and 1-17.
Kim, L., "XML Spy, XML Integrated Development Environments, Accelerating XML Application Development in the Enterprise," Altova Inc. & Altova GmbH 2002, published on the Internet as of Aug. 21, 2002, from link to: http://web.archive.org/web/20020802160016/www.www.xmlspy.com/resources_wp.html, pp. 1-20.
GlobalScape, "CuteFTP Pro, User'sGuide," published on the Internet as of Aug. 14, 2002, from link to: http://web.archive.org/web/20020814133509/www.globalscape.com/support/manuals.shtml, downloaded pp. 1-108.
XIASOFT, "Streamlining content creation, retrieval, and publishing on the Web, Using TEXTML Server and XML Spy 4 Suite in an integrated, Web publishing environment," White Paper, Jul. 2002, pp. 1-16.
Office Communication dated Nov. 6, 2009 in related U.S. Appl. No. 10/690,980.
Decision on Appeal dated Sep. 4, 2009 in related U.S. Appl. No. 10/690,214.
Non-final Office Action dated Jun. 10, 2010 in related U.S. Appl. No. 10/690,214.
Final Office Action dated Dec. 29, 2009 in related U.S. Appl. No. 10/690,214.
Non-final Office Action dated Jan. 27, 2010 in related U.S. Appl. No. 11/841,428.
Berners-Lee, et al., Memorandum from URI Working Group Request for Comments, RFC1738.txt, Dec. 1994.
Safari Tech Books Online, Macromedia®, Dreamweaver® MX: Training from the Source overview located at http://proquest.safaribooksonline.com (Jul. 23, 2002).

* cited by examiner

CONFIGURABLE FILE PLACEMENT

CROSS-REFERENCE TO RELATED APPLICATIONS

The present application is related to commonly owned, co-pending U.S. patent application Ser. No. 10/689,860, entitled, "CROSS-PROTOCOL URL MAPPING," and commonly-owned, co-pending U.S. patent application Ser. No. 10/689,870, entitled, "AUTOMATIC SET UP FOR EDITING A WEBSITE," the disclosures of which are incorporated herein.

TECHNICAL FIELD

The present invention relates, in general, to Web development and, more specifically, to a system and method for configurable file placement.

BACKGROUND OF THE INVENTION

The Internet and the World Wide Web (Web) have become a major part of commerce and information exchange around the world. Web pages are essentially hypertext markup language (HTML) files stored on a Web server and downloaded to a user's computer to be read and displayed by a Web browser. HTML is a markup language that uses tags and metadata to define the appearance of data within the HTML file. The Web browser understands these tags and displays the data in the manner directed by the tags or style information. HTML files also typically include links or connections to secondary files that may be used by the Web browser to display images, such as pictures, movies, documents, or the like. The HTML code generally establishes a link which points to the location of that file on the Web server. As the Web browser reads and renders the HTML code the secondary document is read or downloaded to the HTML page. These secondary files that are immediately downloaded to the HTML page to correctly render the page are referred to herein as secondary dependent files. Some secondary files, however, do not automatically load into the HTML page, but remain associated with a hyperlink on that page. The determination of whether a file is a secondary dependent file, or merely a secondary file is typically governed by the manner in which the file is referenced in the HTML page.

For example, a Web page that displays ten photographs and some descriptive text will typically consist of eleven files. The first file is the underlying HTML file that defines the layout and appearance of the Web page. This file defines ten locations for the photographs and includes a linking statement or label for each of the photographs. Each of the ten photograph files are also present on the Web server in some relation to the main HTML page. The HTML file will usually include the path name or uniform resource locator (URL) to the image file that it uses to display in the image portion of the rendered Web page. When a Web surfer requests to view a certain Web page, the Web browser issues a request to the URL of the Web page. The URL identifies the particular Web server on which the main HTML file resides. When the Web server receives the request, it serves the main HTML file to the requesting Web browser. As the browser reads the HTML code, it usually transmits subsequent requests for each secondary dependent file linked for display in the main page using the specific pathname or URL included in the HTML file. The Web server will generally serve those secondary dependent files to the browser for the browser to complete the rendering of the Web page.

Secondary documents may also be associated with Web pages through a link only. For example, a Web page that provides a list of documents available for viewing by a user may contain a single HTML page with a hyperlink for each of the available documents. When the HTML page loads in the Web browser, these secondary documents are not typically downloaded or read. Instead, a hyperlink is presented to a user that allows the users to select which document he or she wishes to review. On selection of the hyperlink, the Web browser issues the request to the Web server to retrieve the associated document.

Web developers generally design Web pages on a local computer either individually or as a part of a design team prior to publishing the pages to a live location on a Web server. The designed Web pages may be made up of multiple HTML files each having several secondary files. These files that make up the finished Web page will typically be stored on the hosting Web server at locations that are accessible to the requesting Web browsers. In order to store or upload these Web files, the Web developer typically needs to know the exact file locations on the Web server to place the files.

In order to increase efficiency and predictability in Web interaction, Web or HTML files and secondary files are usually placed in a specific, customary, or standardized file structure. This may prevent Web developers from placing files in a prohibited location, an incorrect location, or a location that would violate the Web developer's placement privileges. Style information, such as in Cascading Style Sheets (CSS), for example, may be contained in a style file that applies to more than one HTML page. Thus, these shared files are typically placed in a standardized or predictable location on the Web server, so that each applicable HTML page may access it for the style information. If one of these files were not placed in its expected location on the Web server, the Web page, or even all the associated Web pages in the case of a CSS file, may not display as expected.

Large companies are typically able to dedicate considerable resources to maintaining and developing Web pages and Websites. Site administrators and professionals are employed specifically to ensure that the filing system is efficient and accessible. Smaller companies and individuals, who may not even own or have direct control over the equipment on which their Website is hosted, may not typically understand or even know the file structure of a hosting Web server.

Web development software, such as MACROMEDIA INC.'s DREAMWEAVER™, MICROSOFT CORPORATION's FRONT PAGE™, ADOBE SYSTEMS, INC.'s GO LIVE™, and the like, each facilitate the design of Web pages and the relationships with any secondary and/or dependent assets. However, when publishing the Web pages and their associated secondary files, a file transport system, such as File Transport Protocol (FTP) is used to upload the Web files directly to the hosting Web server. Typically, this uploading process includes the Web designer specifying the exact location on the Web server to place the files. This type of information is not generally freely available to anyone in the public. It is specialized information that would be difficult for non-professional Web developers to obtain.

Software applications have been developed attempting to add some structure to this random or dynamic file placement process when publishing Web pages. Web maintenance software, such as early versions of MACROMEDIA INC.'s CONTRIBUTE™, include logic that attempts to discover the file locations in which to place Web pages on a Web server. Examples of such logic are described in commonly owned, co-pending U.S. patent application Ser. No. 10/689,860, entitled, "CROSS-PROTOCOL URL MAPPING," and commonly-owned, co-pending U.S. patent application Ser. No. 10/689,870, entitled, "AUTOMATIC SET UP FOR EDITING A WEBSITE," the disclosures of which are incorporated herein. Using the deduced pathways, these early Web maintenance applications established a set of rules for dispersing any dependant files automatically. For examples, any secondary files that had an extension of GIF (Graphics Interchange Format), or other graphics format, such as JPG (Joint Photographics Expert Group format), PNG (Portable Network Graphics), and the like, were automatically placed into a folder named "images" alongside the main HTML file for that page. Being placed alongside the file means to place the file on the same hierarchical level within the filing system. Similarly, if a secondary file had a DOC extension (for MICROSOFT WORD™ word processing format), WPD (for COREL CORPORATION's WORDPERFECT™), PDF (Portable Document Format), and the like, that document was automatically placed into a folder named "document" also alongside the main HTML file. Any files that had extensions that were not recognized or accounted for by the Web maintenance applications were placed alongside the main HTML file.

While this functionality greatly improved the Web publishing experience for non-Web professional developers, there were still shortcomings. For example, because early versions of CONTRIBUTE™ did not provide special treatment for style sheet files, such as CSS files, a single CSS file, that may be intended to support multiple HTML files would be copied into the location alongside each HTML file that was published to the Web server. Thus, even though the supporting CSS file was capable of supporting multiple HTML pages, it was stored multiple times on the Web server. Moreover, if a Web administrator set up the Web server file structure in a manner that was different than the standard or customary file structure using images/documents folder system defined by CONTRIBUTE™, he or she would have to either disable this feature or manually move the files from the automatically-placed locations into the proper locations, in which the developer would need to know what the file structure actually is. Therefore, while the improved features offered in the prior versions of CONTRIBUTE™ alleviated some of the problems with the Web publishing mechanism, it did not solve all of the problems.

SUMMARY

The present invention is directed to a system and method for publishing to a Web server. A user enters a set of placement rules or policies governing the placement of files onto the Web server. These placement rules set a location on the Web server for storing the various files supporting a request to publish to the Web server. File extensions or other types of file type identifiers are used in the rules to assign certain types of files to the desired locations. When a developer or designer requests to publish to the Web server, all of the files supporting this publication request are read to determine their file extensions or file types. Using the file extensions or type, a location is assigned to each of the files that corresponds to the location assigned in the placement rules. Therefore, once the user selects to publish the Web page and its supporting Web files, the system automatically fans the individual underlying files to the appropriate places on the Web server according to the placement rules or policies. The user is, thus, not required to know the exact locations of any of the file structures on the Web server. Moreover, the Web administrator has the ability to custom design the placement rules for any file types, extensions, or multiple extensions, and to control how the file placement is to occur, whether relative to the root directory of the Web server, placed into a new folder, placed alongside the main or parent HTML file, or the like.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION

Figure 1A:
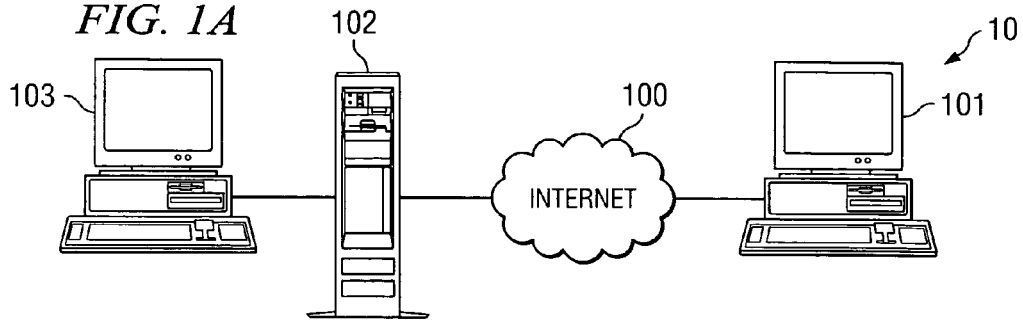
FIG. 1A is a block diagram illustrating a system supporting the World Wide Web.

FIG. 1A is a block diagram illustrating system 10 as a part of the World Wide Web. Internet 100 facilitates user 101 accessing Web pages and Web sites stored on Web server 102. User 101 would typically enter the URL of the Web page that he or she desires to view. The URL or its equivalent is transmitted over Internet 100 to Web server 102, which locates the HTML file associated with that Web page and transmits it back to user 101. The Web browser running on user 101 would read and render the HTML code received from Web server 102 and make repeated requests to Web server 102 for any secondary dependent or linked files that are to be displayed in the Web page.

In the beginning of the process, Web designer 103 designed the Web page that includes the HTML file and all of its secondary files. After the design was complete, Web designer 103 uploaded the files that made up the particular Web page.

Subsequently, if Web designer 103 were to edit the Web page, those files would be downloaded from Web server 102 back to Web designer 103, edited, and the uploaded to Web server 102 for further access via Internet 100. In prior systems, Web designer 103 knew or selected the exact file location or pathname to store the Web files onto Web server 102.

Figure 1B:
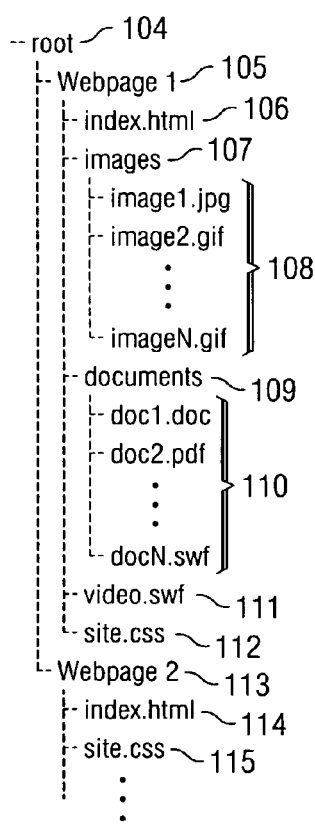
FIG. 1B is a file diagram illustrating a file structure supporting a Web page.

FIG. 1B is a file diagram illustrating file structure 11 supporting a Web page. File structure 11 is a listing of the Web site file structure that may exist on a Web server, such as Web server 102 (FIG. 1A). Root directory 104 provides the top most reference point in file structure 11 of the overall Web site. Webpage1 directory 105 provides a folder location for a first Web page. Within Webpage1 directory 105, index.html 106 provides the basic HTML document defining the Web page. When a user requests to view the Web page by entering the URL, the Web server accesses the location of the Web page, Webpage1 directory 105 in the illustrated example, and serves the main HTML page, index.html 106, back to the user's browser. A number of secondary dependent documents support index.html 106 and are stored in locations within the same folder, Webpage1 directory 105. All of the images, images 108, used by index.html 106 are stored in images folder 107. Images folder 107 is placed alongside index.html 106 in Webpage1 directory 105. A Web developer that uploads Web files would ordinarily specify the exact pathname for images folder 107 when uploading images 108 which may include pathways above root directory 104, as the Web site using Webpage1 directory 105 may not be the only Web site or data stored on Web server 102.

Index.html 106 also contains links to downloadable documents that exist in WORD™ DOC format and PDF. These secondary, but not dependent, documents, documents 110, are stored in documents folder 109. Typically, any additional secondary documents that would not be recognized may be filed alongside of index.html 106 within Webpage1 directory 105. Media clips, such as video.swf 111, are illustrated on the same level in Webpage1 directory 105 as index.html 106. Additionally, when publishing the Web page, the developer has stored CSS files, such as site.css 112, alongside index.html 106. In prior systems, the Web developer either needed to use the direct path in order to store the Web documents or, in software applications, such as early versions of CONTRIBUTE™, logic automatically set up standard folders for files that have a certain extension. These automatically generated folders would typically be set up alongside of the main HTML Web document. Thus, if multiple Web pages, such as the pages defined by index.html 106 and index.html 114, were uploaded to Web server 102 and each used the same CSS file, that same CSS file would be stored multiple times, site.css 112 and site.css 115, onto the Web server.

Figure 2:
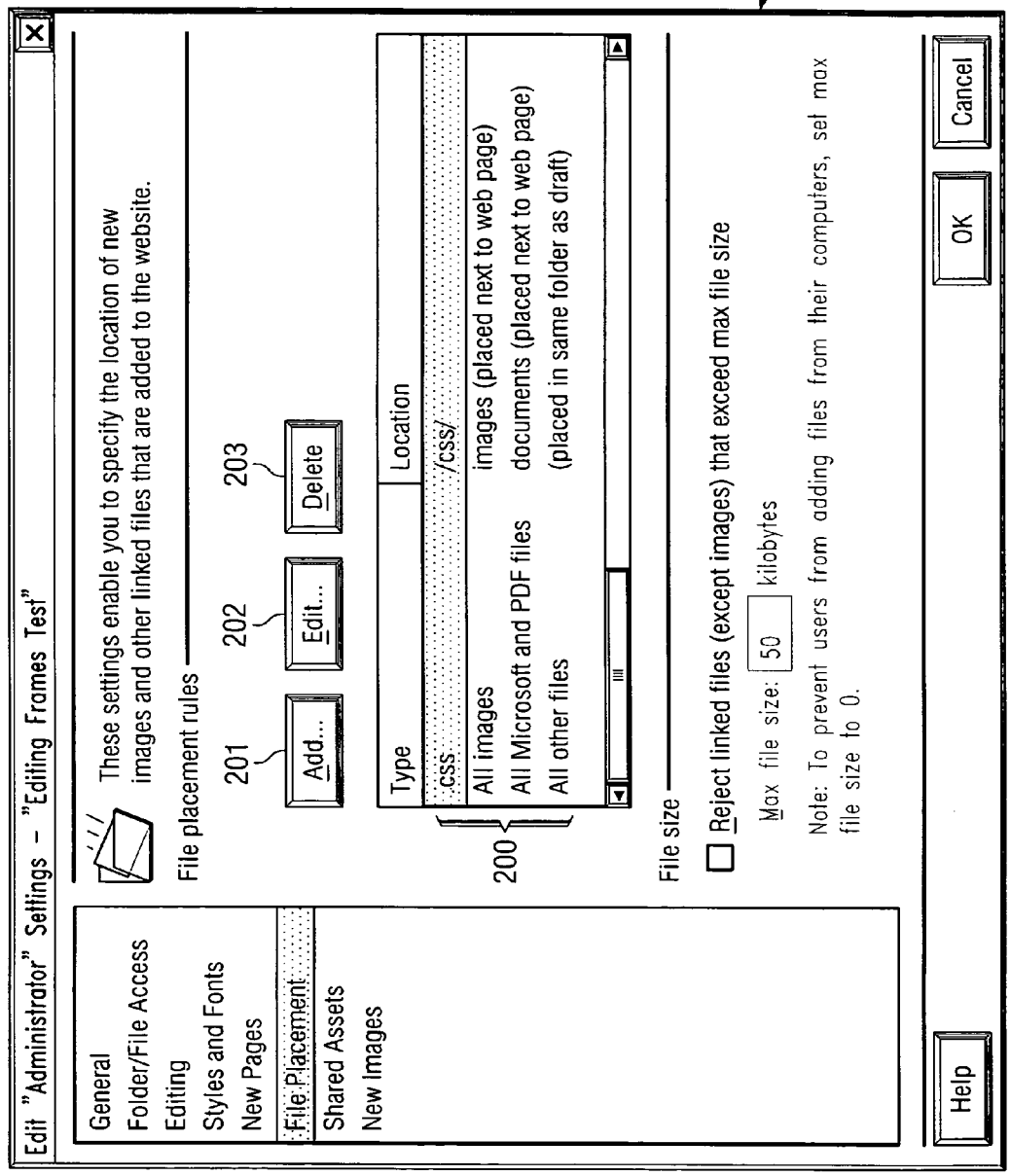
FIG. 2 is an illustration of a dialog box generated in a development environment configured according to one embodiment of the present invention.

FIG. 2 is an illustration of dialog box 20 generated in a development environment configured according to one embodiment of the present invention. Instead of creating a static set of rules for placing Web documents onto a Web server, the development environment configured according to one embodiment of the present invention allows the user or administrator to create and customize the rules for placement on the Web server. An example of such a development environment or web maintenance application is the latest versions of CONTRIBUTE™. In response to the user selecting to customize the file locations, dialog box 20 is presented. Rules window 200 displays the placement rules that are currently in place, defining the type of file that will be placed in a specific location on the Web server. As indicated in rules window 200, Web documents may be placed in static locations on the Web server, such as with the .css files, and may also be placed in relative locations, relative to the HTML file defining the Web page or relative to the root directory of the Web site. The user has full rights to manipulate the rules through Add button 201, Edit button 202, and Delete button 203. Thus, the placement rules and locations are customizable according to the desire of the user or Website administrator or to the existing structure of the Web site.

Figure 3:
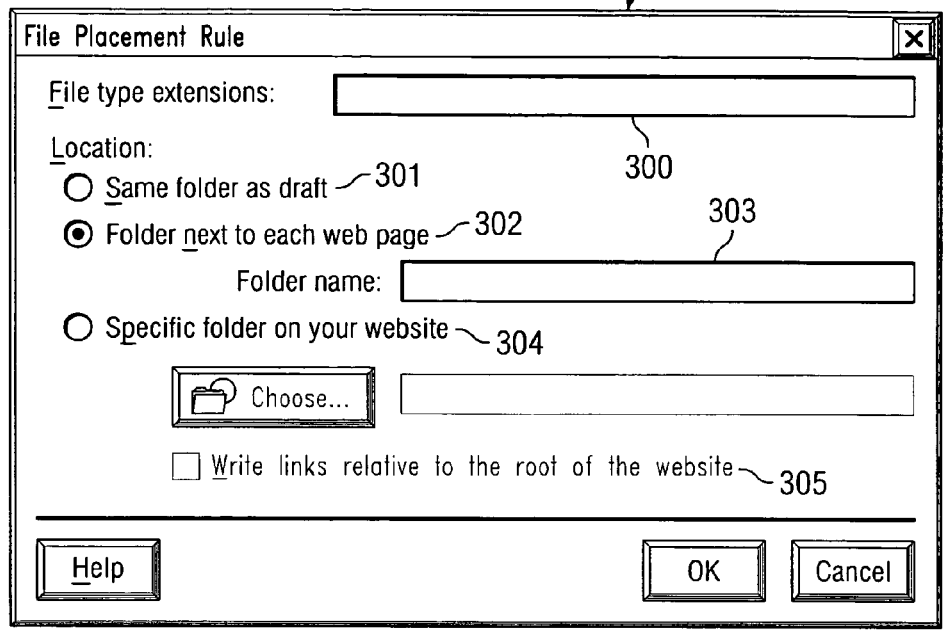
FIG. 3 is an illustration of a rule menu generated in a development environment configured according to one embodiment of the present invention.

FIG. 3 is an illustration of rule menu 30 generated in a development environment configured according to one embodiment of the present invention. The development environment presents rule menu 30 to the user when he or she desires to modify or create a placement rule. Extension field 300 allows the user to define particular extensions to use in assigning the Web files to their destination locations. Standard file extensions may define the type of file. For example, the user may designate that all GIF files be placed alongside the underlying draft by selecting same folder as draft button 301. If, however, the user desired to place the GIF files in a folder alongside the underlying draft, or Web page-relative, he or she would activate folder-next-to-each-web-page button 302 and then enter the name of the target folder in folder field 303. The user may, instead, desire to place all GIF files in a specific folder on the Web server by activating specific-folder-on-your-website button 304. This specific folder option may be defined relative to the root directory of the Web site by checking check box 305 indicating to write links relative to the root of the Web site. Otherwise, links may be written relative to the Web page.

In operation, the user would enter each of the one or more file extensions or file types that he or she believes may be included in the Web pages and assigns a static or relative location on the Web server, including identifying a folder, which, if it did not already exist, would be generated on the Web server. Thereafter, when the user or any other Web designer or additional user were to attempt to publish a Web page with an underlying HTML page and various, multiple secondary resources, the logic of the development environment or application would automatically read the file extension or MIME type of the Web document and fan those documents out to their assigned locations according to the placement rules. MIME (Multipurpose Internet Mail Extensions) is a common method for transmitting non-text files via Internet e-mail. It uses a header that is added to the file which includes the type of data contained and the encoding method used. The MIME type has become a de facto standard for describing file types on the Internet. Thus, an administrator of the Web site could set up the placement rules that allow the content providers or developers to create the Web page and simply select to upload the supporting Web documents without needing to know the exact path location or the specific file structure supporting the Web site.

It should be noted that users and Website administrators may enter any type of extension in defining placement rules. The various embodiments of the present invention are not limited only to standard file extensions. In fact, a user may enter a completely customized file extension that is exclusive to that user and still create a placement rule for storing files having that custom extension onto the Web server. Moreover, MIME types, such as image/gif, application/x-pdf, text/plain, or the like, may be designated by the user or administrator for controlling or defining placement rules. It should be noted that other methods for defining file types may be used in implementing various embodiments of the present invention.

Figure 4:
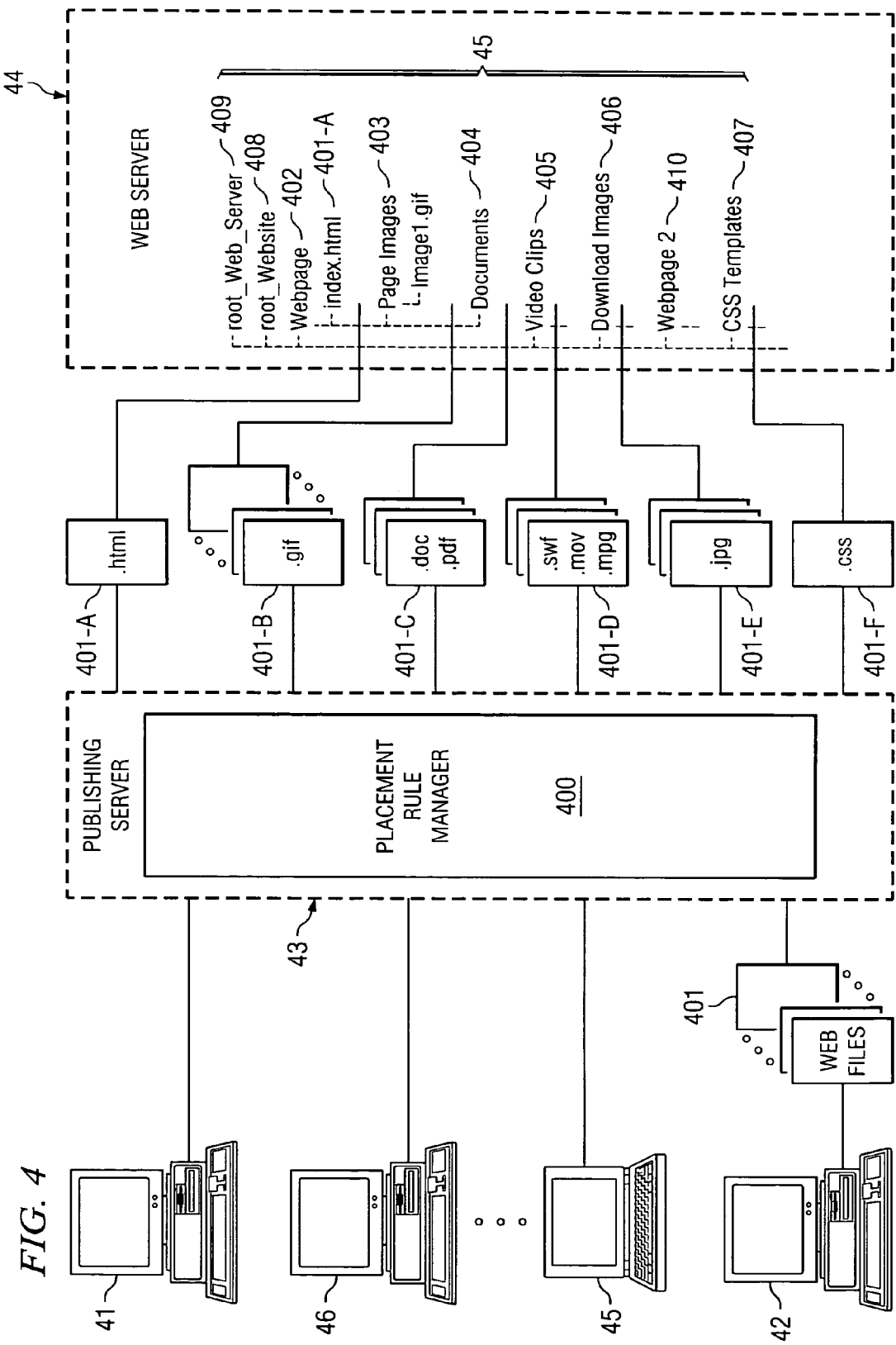
FIG. 4 is a block diagram illustrating a Web publishing system configured according to another embodiment of the present invention.

FIG. 4 is a block diagram illustrating Web publishing system 40 configured according to another embodiment of the present invention. Placement rule manager 400 is located on publishing server 43. Publishing server 43 assists in the Web development process by coordinating the development efforts between site administrator 41, Web developers 42, 45, and 46, and Web server 44. Site administrator 41 sets the various rules for file placement on Web server 44. These rules are maintained in placement rule manager 400. Any Web documents that are published in Web publishing system 40 are published through publishing server 43 which uses placement rule manager 400 to determine where to place the various files onto Web server 44. An example of such a Web publishing system is MACROMEDIA INC.'s WEB PUBLISHING SYSTEM™.

In operation, Web developer 42 completes a Web page, which comprises Web files 401, including a main HTML document and several supporting secondary resources, and sends Web files 401 to publishing server 43. Publishing server 43 accesses placement rule manager 400 to determine the various placement rules for Web server 44. Using those placement rules, publishing server 43 reads the file extensions for each of the files in Web files 401 and sends each file to the appropriate location in file structure 45 on Web server 44 according to the placement rules. In the illustrated example, HTML document 401-A is separated from Web files 401 and stored in WebPage folder 402 of Web server 44. GIF files 401-B are stored in PageImages folder 403 of Web server 44. DOC and PDF files 401-C are stored in documents folder 404 of Web server 44. Video files 401-D are stored in VideoClips folder 405 of Web server 44. JPG files 401-E are stored in DownloadImages folder 405, and CSS file 401-F is stored in SiteCSS folder 407, each of Web server 44.

Instead of building a Web site using standardized or limited folder organizations, site administrator has designed file structure 45 on Web server 44, including folders 402-406. SiteCSS folder 407 has been created as a resource to each associated Web page of the Website at root_Website 408 stored on Web server 44. Some of the folders, such as PageImages folder 403 and Document folder 404, are arranged alongside of HTML document 401-A in WebPage folder 402, while other folders, such as VideoClips folder 405, DownloadImages folder 406, and SiteCSS folder 407 may exist outside of WebPage folder 402. The logic supporting publishing server 43 and placement rule manager 400 allow for site administrator to design file structure 45 in a customized manner.

It should be noted that site manager 43 could select all of the folders to be placed within WebPage folder 402, or may selectively provide some, but not all, within WebPage folder 402. The various embodiments of the present invention do not limit the selection of the structure of the Web site or Web server 44.

In designing file structure 45, Web administrator 41 may set placement rules that are relative to the Web page, such as index.html 401-A or relative to the root directory of the Website, such as root_Website 408. For example, if Web administrator 41 designates for GIF images to be placed in an Images folder relative to the Web page, then any GIF secondary files uploaded to Web server 44 will be placed in an Images folder at the same hierarchical level as the Web page, such as GIF files 401-B being placed into PageImages folder 403, which is at the same hierarchical level as index.html 401-A on Web server 44. Therefore, when the system searches for the Images folder, it will search for that folder on the level of images.html 401-A. If it did not exist, the file system of Web server 44 would create the folder, PageImages 403.

Furthermore, if Web administrator 41 designates that JPG images are to be placed into an Images folder relative to the root of the Website, then any JPG secondary files uploaded to Web server 44 will be placed in an Images folder at the same level as other files or folders in the root folder for the Website, such as JPG secondary files 401-E being stored in DownloadImages 406 folder existing one level under root_Website 408, which is the root folder of the Website on Web server 44. If Web administrator 41 creates a rule that would place certain sound files, such as Advanced Audio Coding (AAC) files, into a file named music\acc_files, when AAC files are uploaded, they would be filed in a location at path name root_Webserver\root_Website\music\acc_file when the administrator has designated the placement rule to be root-relative. Alternatively, if the administrator designated the placement rule to be Web page-relative, these AAC files would be stored into a location at path name root_Webserver\root_Website\WebPage\music\acc_file.

It should be noted that, in additional and/or alternative embodiments of the present invention, SiteCSS folder 407 may be a standard or default folder or location that defines the location of every CSS file that is to be published on Web server 44. In some of such embodiments, a comparison may be made of any CSS files already existing within SiteCSS folder 407 or otherwise already on Web server 44 to ensure that duplicate CSS files are not placed onto Web server. This determination process would beneficially save storage space on Web server 44.

Figure 5:
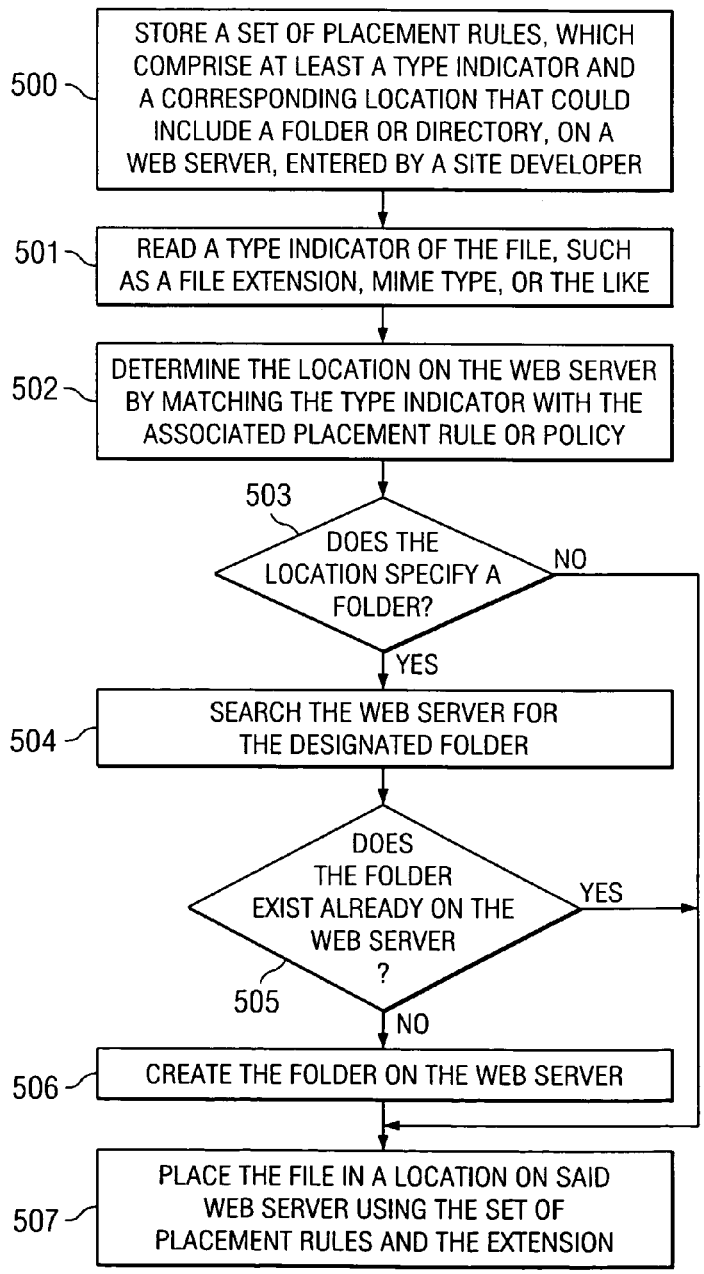
FIG. 5 is a flowchart illustrating example steps performed in implementing one embodiment of the present invention.

FIG. 5 is a flowchart illustrating example steps performed in implementing one embodiment of the present invention. In step 500, a set of placement rules, which comprise at least a type indicator and a corresponding location that could include a folder or directory, is stored on a Web server, entered by a site developer. A type indicator, which may be a file extension, a MIME type, or the like, of the file is read in step 501. The location on the Web server is determined, in step 502, by matching the type indicator with the associated placement rule or policy. In step 503, a determination is made whether the location specifies a folder. If no folder is designated, the file is placed in the location on the Web server, in step 507, using the set of placement rules and the type indicator. If a folder is designated, the Web server is searched, in step 504, for the designated folder. A determination is made, in step 505, whether the folder exist already on the Web server. If so, the file is then placed in the specified location in step 507. If the folder does not exist, the folder is created, in step 506, on the Web server and placed in the specified location in step 507.

The program or code segments making up the various embodiments of the present invention may be stored in a computer readable medium or transmitted by a computer data signal embodied in a carrier wave, or a signal modulated by a carrier, over a transmission medium. The "computer readable medium" may include any medium that can store information. Examples of the computer readable medium include an electronic circuit, a semiconductor memory device, a ROM, a flash memory, an erasable ROM (EROM), a floppy diskette, a compact disk CD-ROM, an optical disk, a hard disk, a fiber optic medium, and the like. The computer data signal may include any signal that can propagate over a transmission medium such as electronic network channels, optical fibers, air, electromagnetic, RF links, and the like. The code segments may be downloaded via computer networks such as the Internet, Intranet, and the like.

Figure 6:
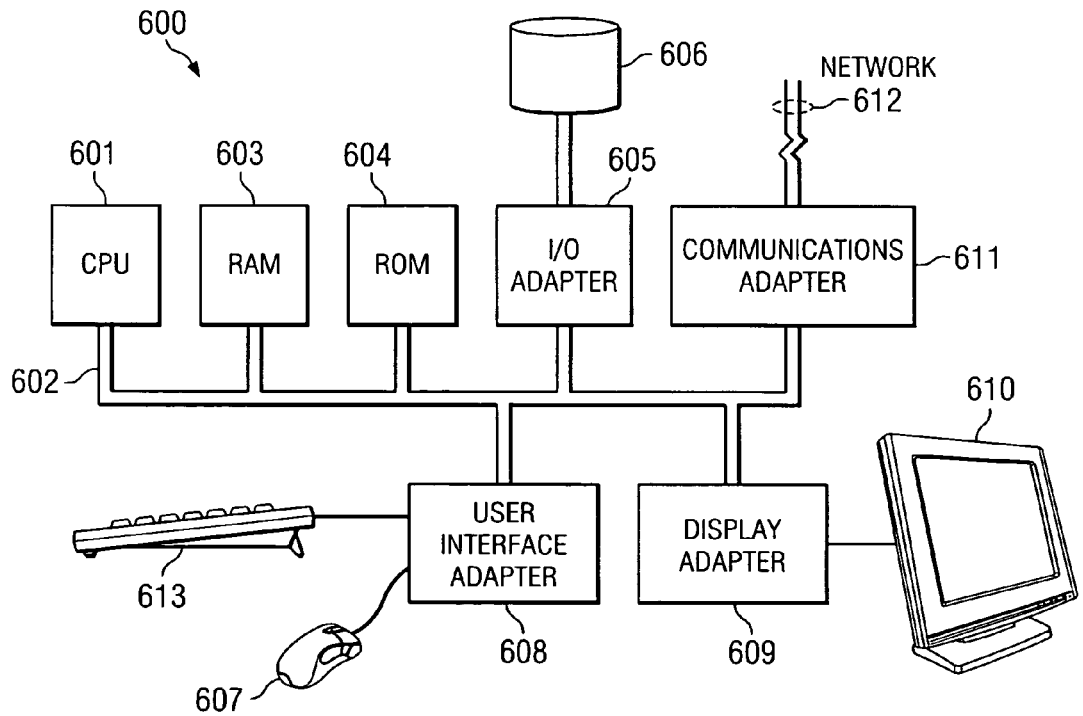
FIG. 6 illustrates a computer system adapted to use embodiments of the present invention.

FIG. 6 illustrates computer system 600 adapted to use embodiments of the present invention, e.g. storing and/or executing software associated with the embodiments. Central processing unit (CPU) 601 is coupled to system bus 602. The CPU 601 may be any general purpose CPU. However, embodiments of the present invention are not restricted by the architecture of CPU 601 as long as CPU 601 supports the inventive operations as described herein. Bus 602 is coupled to random access memory (RAM) 603, which may be SRAM, DRAM, or SDRAM. ROM 604 is also coupled to bus 602, which may be PROM, EPROM, or EEPROM. RAM 603 and ROM 604 hold user and system data and programs as is well known in the art.

Bus 602 is also coupled to input/output (I/O) controller card 605, communications adapter card 611, user interface card 608, and display card 609. The I/O adapter card 605 connects storage devices 606, such as one or more of a hard drive, a CD drive, a floppy disk drive, a tape drive, to computer system 600. The I/O adapter 605 is also connected to a printer (not shown), which would allow the system to print paper copies of information such as documents, photographs, articles, and the like. Note that the printer may be a printer (e.g., dot matrix, laser, and the like), a fax machine, scanner, or a copier machine. Communications card 611 is adapted to couple the computer system 600 to a network 612, which may be one or more of a telephone network, a local (LAN) and/or a wide-area (WAN) network, an Ethernet network, and/or the Internet network. User interface card 608 couples user input devices, such as keyboard 613, pointing device 607, and the like, to the computer system 600. The display card 609 is driven by CPU 601 to control the display on display device 610.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A computer implemented method comprising:
   storing, in a Web server, a set of placement rules entered by a site developer, each of the set of placement rules comprising at least a type indicator and a location associated with the type indicator, the type indicator indicating a Multipurpose Internet Mail Extensions (MIME) type;
   receiving one or more files to be published to said Web server; and
   reading a type indicator of each of said one or more files; and
   placing, based on said set of placement rules, each of said one or more files in a location on said Web server according to said type indicator,
   wherein said location comprises a root-relative location, a file-relative location, or a full pathname location.

2. The method of claim 1 wherein said type indicator comprises
   a file extension.

3. The method of claim 1 further comprising:
   displaying an edit interface on a display device to said site developer, wherein said site developer interacts with said edit interface to enter said set of placement rules.

4. The method of claim 1 wherein said location comprises a folder, said method further comprising:
   searching said Web server for said folder prior to said placing; and
   creating said folder on said Web server responsive to failing to find said folder during said searching.

5. The method of claim 1 further comprising:
   placing each of said one or more files into a style sheet location on said Web server when said type indicator is a style sheet extension.

6. The method of claim 5 further comprising:
   prior to said placing, comparing each of said one or more files to one or more style sheet files stored in said style sheet location; and
   responsive to finding a matching one of said one or more style sheet files, skipping said placing step.

7. A computer implemented method comprising:
   storing, on a Web server, one or more placement policies entered by a user, each placement policy comprising at least a type indicator and a storage location associated with the type indicator and said storage location comprising one or more of: a root-relative location, a file-relative location, or a full pathname location;
   receiving a command to publish Web page from a publisher, wherein said Web page comprises a plurality of files;
   responsive to receiving said command, reading a file type for each of said plurality of files, wherein the file type indicates a Multipurpose Internet Mail Extensions (MIME) type;
   looking up a storage location in said one or more placement policies according to said file type; and
   saving each of said plurality of files at said storage location in said Web server.

8. The method of claim 7 wherein said file type comprises a file extension.

9. The method of claim 7 wherein said plurality of files comprises:
   a hypertext markup language (HTML) file; and
   one or more secondary resource files.

10. The method of claim 7 further comprising:
    displaying an editing region on a display device for said user to one of: edit and enter, said one or more placement policies.

11. The method of claim 7 further comprising:
    generating said storage location responsive to failing to find said storage location during said looking up.

12. The method of claim 7 further comprising:
    prior to said saving, comparing each of said plurality of files to one or more files stored at said storage location; and
    responsive to finding a matching one of said one or more files, skipping said saving for said matching one.

13. A computer implemented method comprising:
    receiving, at a Web server, a set of placement rules, said set of placement rules comprising:
      one or more type indicators representing one or more Web file types capable of residing on said Web server, each type indicator indicating a Multipurpose Internet Mail Extensions (MIME) type; and
      a storage area on said Web server associated with each of said one or more type indicators, the storage area comprising a root-relative location, a file-relative location, or a full pathname location;
    receiving a request to publish a Web page, said Web page comprising a plurality of Web files;

reading an assigned type indicator of said one or more type indicators for each of said plurality of Web files; and storing each of said plurality of Web file in said storage area of said Web server associated with said assigned type indicator.

14. The method of claim 13 wherein said one or more type indicators comprise
a file extension.

15. The method of claim 13 further comprising:
responsive to said assigned type indicator representing a style sheet file, storing said style sheet file in a style sheet location on said Web server.

16. The method of claim 13 further comprising:
rendering an edit interface on a display device, wherein a user enters said set of placement rules using said edit interface.

17. The method of claim 13 wherein said storage area includes a directory.

18. The method of claim 17 further comprising:
searching said Web server for said directory; and
responsive to not finding said directory, generating said directory in said storage area on said Web server.

19. A computer program product having a non-transitory computer readable storage medium with computer program logic recorded thereon, said computer program product comprising:
code for storing, on a Web server, a set of placement rules entered by a site developer, each of the set of placement rules comprising at least a type indicator and a location associated with the type indicator;
code for receiving one or more files to be published to said Web server:
code for reading a file type of each of said one or more files, the file type identifying a Multipurpose Internet Mail Extensions (MIME) type;
code for placing each of said one or more files in a location on said Web server using said set of placement rules and said file type, wherein said location comprises a root-relative location, a file-relative location, or a full pathname location.

20. The computer program product of claim 19 wherein said file type
further comprises
a file extension.

21. The computer program product of claim 19 further comprising:
code for displaying an edit interface on a display device to said site developer, wherein said site developer interacts with said edit interface to enter said set of placement rules.

22. The computer program product of claim 19 wherein said location comprises a folder, said method further comprising:

code for searching said Web server for said folder prior to executing said code for placing; and
code for creating said folder on said Web server responsive to failing to find said folder during execution of said code for searching.

23. The computer program product of claim 19 further comprising:
code for placing said file into a style sheet location on said Web server when said file type is a style sheet extension.

24. The computer program product of claim 23 further comprising:
prior to executing said code for placing, code for comparing said file to one or more style sheet files stored in said style sheet location; and
responsive to finding a matching one of said one or more style sheet files, code for jumping over said code for placing.

25. A system comprising:
a web server, said web server comprising:
central processing unit (CPU);
a storage device coupled to said CPU; and
a placement rule manager stored on said storage device, wherein, when executed by said CPU, said placement rule manager configures said web server to:
receive one or more placement policies comprising at least a type indicator and a location associated with the type indicator; and
store said one or more placement policies in said storage device;
wherein, on receipt by said web server of a command to publish a web page comprising a plurality of files, said executed placement rule manager further configures said web server to:
read a type identifier for each of said plurality of files, the type identifier identifying a Multipurpose Internet Mail Extensions (MIME) type;
look up a storage location identified in said one or more placement policies according to said type identifier, the storage location comprising a root-relative location, a file-relative location, or a full pathname location; and
save each of said plurality of files in said storage device at said storage location.

26. The system of claim 25 wherein said type identifier comprises
a file extension.

27. The system of claim 25 wherein said plurality of files comprises:
a hypertext markup language (HTML) file; and
one or more secondary resource files.

28. The system of claim 25 wherein, responsive to said web server failing to find said storage location during said look up, said placement rule manager further configures said web server to generate said storage location in said storage device.

* * * * *